(12) United States Patent
Wahnish et al.

(10) Patent No.: US 12,321,966 B1
(45) Date of Patent: Jun. 3, 2025

(54) METHODS, SYSTEMS, AND DEVICES FOR AGING AND GRADING OPPORTUNITIES FOR NON-FUNGIBLE TOKENS

(71) Applicant: Clever Era, LLC, Waxhaw, NC (US)

(72) Inventors: Todd Andrew Wahnish, Waxhaw, NC (US); Mark Benjamin Wahnish, Tampa, FL (US); James Sheldon Hallett, Brooklyn, NY (US)

(73) Assignee: Clever Era, LLC, Waxhaw, NC (US)

( * ) Notice: Subject to any disclaimer, the term of this patent is extended or adjusted under 35 U.S.C. 154(b) by 257 days.

(21) Appl. No.: 17/822,323

(22) Filed: Aug. 25, 2022

Related U.S. Application Data

(60) Provisional application No. 63/236,729, filed on Aug. 25, 2021.

(51) Int. Cl.
*G06Q 30/02* (2023.01)

(52) U.S. Cl.
CPC .................. *G06Q 30/0278* (2013.01)

(58) Field of Classification Search
CPC ................................................ G06Q 30/0278
See application file for complete search history.

(56) References Cited

U.S. PATENT DOCUMENTS

| | | | | |
|---|---|---|---|---|
| 6,102,207 A | * | 8/2000 | Carse | B65D 85/00 206/459.1 |
| 10,505,726 B1 | * | 12/2019 | Andon | H04L 9/3297 |
| 11,335,153 B1 | * | 5/2022 | Finley | G06N 3/08 |
| 11,374,756 B1 | * | 6/2022 | Myers | H04L 9/3213 |
| 11,756,127 B1 | * | 9/2023 | Lopez | G06Q 30/0185 705/4 |
| 2001/0034694 A1 | * | 10/2001 | Elias | G06Q 40/04 705/37 |
| 2006/0181180 A1 | * | 8/2006 | McCabe | A47F 3/001 312/114 |
| 2007/0187266 A1 | * | 8/2007 | Porter | B42F 7/025 206/459.5 |
| 2013/0117156 A1 | * | 5/2013 | Azmi | G06Q 30/0278 705/26.35 |

(Continued)

FOREIGN PATENT DOCUMENTS

WO    WO-2022016102 A1 *  1/2022 ............. G06F 21/10

OTHER PUBLICATIONS

Christian Petersson Nielsen, Elias Ribeiro da Silva, Fei Yu, Digital Twins and Blockchain—Proof of Concept, 2020, Procedia CIRP, vol. 93, pp. 251-255. (Year: 2020).*

*Primary Examiner* — Sarah M Monfeldt
*Assistant Examiner* — Karma A El-Chanti
(74) *Attorney, Agent, or Firm* — NK Patent Law

(57) ABSTRACT

Disclosed herein are methods, systems, and devices for generating distinguishing factors between multiple reproductions of a digital asset. As an example, unique aging and grading of digital assets are disclosed. In one embodiment, a computer implemented method for maintaining a digital asset is disclosed. The computer implemented method includes receiving the digital asset, wherein the digital asset is associated with a blockchain. The computer implemented method further includes modifying the digital asset to provide a first effect; securing the first modified digital asset to the blockchain; determining a grade of the modified digital asset; and securing the grade to the blockchain. an alternate blockchain, a sidechain, and/or a server host.

19 Claims, 10 Drawing Sheets

(56) References Cited

U.S. PATENT DOCUMENTS

| | | | | |
|---|---|---|---|---|
| 2016/0217416 | A1* | 7/2016 | Searls | G06Q 10/087 |
| 2018/0246895 | A1* | 8/2018 | Kass | G06F 16/5838 |
| 2019/0026685 | A1* | 1/2019 | Chappell | G06Q 10/087 |
| 2019/0251551 | A1* | 8/2019 | Mousavi | G06K 19/00 |
| 2020/0285970 | A1* | 9/2020 | Dagley | G06Q 10/20 |
| 2020/0311452 | A1* | 10/2020 | McConnell | G06V 10/143 |
| 2021/0056598 | A1* | 2/2021 | Patton | G06F 17/18 |
| 2021/0082018 | A1* | 3/2021 | Bull | A63F 13/69 |
| 2021/0082044 | A1* | 3/2021 | Sliwka | H04L 9/3255 |
| 2021/0279695 | A1* | 9/2021 | Rice | G06Q 20/12 |
| 2021/0311931 | A1* | 10/2021 | Prajapati | G06F 16/2458 |
| 2021/0334794 | A1* | 10/2021 | Metnick | G06Q 30/0613 |
| 2021/0342836 | A1* | 11/2021 | Cella | H04L 9/3239 |
| 2021/0350459 | A1* | 11/2021 | Goodman | G06F 18/214 |
| 2021/0358038 | A1* | 11/2021 | Vandenberg | G06Q 20/405 |
| 2021/0390531 | A1* | 12/2021 | Voorhees | G06Q 20/367 |
| 2022/0012446 | A1* | 1/2022 | Dolmayan | B65D 25/54 |
| 2022/0036371 | A1* | 2/2022 | Frisbee | G06V 10/82 |
| 2022/0101245 | A1* | 3/2022 | Daley | G06F 16/953 |
| 2022/0327225 | A1* | 10/2022 | Lyren | H04S 1/007 |
| 2022/0343483 | A1* | 10/2022 | Desai | G06T 5/90 |
| 2023/0033434 | A1* | 2/2023 | Giang | G06Q 20/3827 |

* cited by examiner

METHODS, SYSTEMS, AND DEVICES FOR AGING AND GRADING OPPORTUNITIES FOR NON-FUNGIBLE TOKENS

PRIORITY CLAIM

This application claims priority to U.S. Provisional Patent Application Ser. No. 63/236,729 filed Aug. 25, 2021, titled "METHODS, SYSTEMS, AND DEVICES FOR AGING AND GRADING OPPORTUNITIES FOR NON-FUNGIBLE TOKENS," the disclosure of which is incorporated herein by reference in its entirety.

TECHNICAL FIELD

The present invention relates to non-fungible token (NFTs). More specifically methods, systems, and devices are disclosed for unique grading and aging of NFTs.

BACKGROUND

Non-Fungible Tokens (NFTs), and/or images, video, audio, and 3D objects and other collectible digital media assets are bought, sold, and traded over the internet. NFTs are specifically "one-of-a-kind" digital assets. As such, NFTs can be purchased and sold as a piece of property. For example, NFTs may be traded using cryptocurrency with validation maintained in digital wallets (e.g., MetaMask® and Coinbase Wallet®). A marketplace such as OpenSea®, SuperRare®, Nifty Gateway®, and/or Rarible® may be used for trades. Currently, creators looking to make or "mint" editions of digital media assets (including NFTs) have no ability to generate distinguishing factors between multiple reproductions.

Accordingly, a need exists for new methods, systems, and devices for generating distinguishing factors between multiple reproductions of a digital asset.

SUMMARY

Disclosed herein are methods, systems, and devices for generating distinguishing factors between multiple reproductions of a digital asset. As an example, unique aging and grading of digital assets are disclosed.

In one embodiment, a computer implemented method for maintaining a digital asset is disclosed. The computer implemented method includes (1) receiving the digital asset and the digital asset is associated with a blockchain. The computer implemented method further includes (2) modifying the digital asset to provide a first effect; (3) securing the first modified digital asset; (4) determining a grade of the modified digital asset; and (5) securing the grade to at least one of the blockchain, an alternate blockchain, a sidechain, or a server host.

In some embodiments, the computer implemented method may further include receiving a display request and transmitting a rendering of the modified digital asset to a display upon receiving the display request.

In some embodiments, determining the grade of the modified digital asset may be initiated upon modifying the digital asset to provide the first effect.

In other embodiments, determining the grade of the modified digital asset may be initiated automatically upon receiving the grade request; and the computer implemented method may further include transmitting the grade of the modified digital asset to the display.

In some embodiments, the digital asset may represent a physical object. In further embodiments, the physical object may include a collectable and the first effect may represent a defect of the collectable.

In some embodiments, the physical object may include a case to protect the collectable and the first effect may represent a defect of the case. In further embodiments, the case may include a placard and the placard may display the grade.

In some embodiments, the computer implemented method may further include determining a value of the modified digital asset; and securing the value and a timestamp to at least the blockchain, the alternate blockchain, the sidechain, the server host, and/or the like.

In some embodiments, determining the grade of the modified digital asset may be based on a sequential grading curve beginning at an imperfect condition and evolving over time to a near perfect condition. In some embodiments, determining the grade of the modified digital asset may be based on a sequential grading curve beginning at a near perfect condition and evolving over time to an imperfect condition. In other embodiments, determining the grade of the modified digital asset may be based on a fully randomized grading curve, where the condition is fixed over time.

In some embodiments, the grade of the modified digital asset may be a numerical grade, a letter grade, a phrase, and/or the like. For example, the phrase maybe "Fine," "Very Fine," "Perfect," and/or the like.

In some embodiments, the modified digital asset may be a portion of a non-fungible token (NFT).

In some embodiments, the digital asset may have been previously modified with a previous effect and modifying the digital asset to provide the first effect may be based on a first elapsed time period from when the digital asset was previously modified with the previous effect.

In some embodiments, the first effect may be a physical aging effect, a physical usage effect, and/or the like.

In some embodiments, the computer implemented method may further include receiving a rendering request; and transmitting a rendering of the modified digital asset to a remote device, upon receiving the rendering request. In other embodiments, upon receiving the rendering request, the method may further include sending rendering data to the remote device, wherein the remote device creates the modified asset from the rendering data.

In some embodiments, the modified digital asset may be based an audio sequence and a video sequence, and/or the like.

In another embodiment, at least one server is configured for maintaining a digital asset. The server or servers include at least one unit of memory and at least one processor coupled with the memory. The processor or processors are configured for providing a method. The method includes (1) receiving the digital asset and the digital asset is associated with a blockchain. The method further includes (2) modifying the digital asset to provide a first effect; (3) securing the first modified digital asset to the blockchain; (4) determining a grade of the modified digital asset; and (5) securing the grade to at least one of the blockchain, an alternate blockchain, a sidechain, or a server host.

In another embodiment, a non-transitory computer-readable storage medium storing instructions is configured to be implemented on at least one server including at least one processor. The instructions when executed by the processor or processors cause at least one server to perform a method of maintaining a digital asset. The method includes (1) receiving the digital asset and the digital asset is associated with a blockchain. The method further includes (2) modifying the digital asset to provide a first effect; (3) securing the first modified digital asset to the blockchain; (4) determining a grade of the modified digital asset; and (5) securing the grade to at least one of the blockchain, an alternate blockchain, a sidechain, or a server host.

In another embodiment, a computer implemented method for maintaining a digital asset is disclosed. The computer implemented method includes (1) receiving the digital asset, wherein the digital asset is associated with a blockchain. The computer implemented method further includes (2) modifying the digital asset to provide a first effect and (3) securing the first modified digital asset to the blockchain.

In some embodiments, the computer implemented method may further include receiving a display request and transmitting a rendering of the first modified digital asset to a display upon receiving the display request.

In some embodiments, the computer implemented method may further include determining a grade of the modified digital asset.

In some embodiments, the computer implemented method may further include securing the grade to the blockchain.

In some embodiments, the computer implemented method may further include securing the grade to alternate blockchains, sidechains, server hosts, and/or the like.

In some embodiments, determining the grade of the modified digital asset may be initiated upon modifying the digital asset to provide the first effect.

In some embodiments, the computer implemented method may further include receiving a grade request and transmitting the grade of the modified digital asset to the display.

In some embodiments, determining the grade of the modified digital asset may be initiated automatically upon receiving the grade request.

In some embodiments, the digital asset may represent a physical object.

In some embodiments, the physical object may include a collectable.

In some embodiments, the collectable may be a trading card, a stamp, a coin, a piece of paper currency, a doll, a toy, a model car, a vinyl record cover, a comic book, a piece of art, a piece of jewelry, an audio recording, a video recording, and/or the like.

In some embodiments, the first effect may represent a defect of the collectable.

In some embodiments, the physical object may include a case to protect the collectable. In certain embodiments, the case includes a placard and the placard displays the grade.

In some embodiments, the first effect may represent a defect of the case.

In some embodiments, the computer implemented method may further include determining a value of the modified digital asset, and securing the value and a timestamp to the blockchain.

In some embodiments, determining the grade of the modified digital asset may be based on a sequential grading curve beginning at an imperfect condition and evolving over time to a near perfect condition.

In some embodiments, the determining the grade of the modified digital asset is based on a sequential grading curve beginning at a near perfect condition and evolving over time to an imperfect condition.

In some embodiments, the grade of the modified digital asset is randomly selected and then remains static over time.

In some embodiments, the grade of the modified digital asset may be a numerical value. In certain embodiments, the numerical value may be greater than or equal to zero; and the numerical value is less than or equal to ten.

In some embodiments, wherein the grade of the modified digital asset may be a letter grade.

In some embodiments, the modified digital asset may be a portion of an NFT and the NFT may be stored in a crypto wallet.

In some embodiments, the digital asset may have been previously modified with a previous effect.

In some embodiments, modifying the digital asset to provide the first effect may be based on a first elapsed time period from with the digital asset was previously modified with the previous effect.

In some embodiments, the first effect may be a physical aging effect.

In some embodiments, the first effect may be a physical usage effect.

In some embodiments, the computer implemented method may further include receiving a rendering request and transmitting a rendering of the first modified digital asset to a remote storage device.

In some embodiments, a remote storage device may be associated with a uniform resource locator (URL).

In some embodiments, a remote storage device may be associated with a social networking account.

In some embodiments, the computer implemented method may further include transmitting a rendering of the first modified digital asset to a printer.

In some embodiments, the printer may be a three-dimensional (3D) printer.

In some embodiments, modified digital asset may be based on an audio sequence.

In some embodiments, the modified digital asset may be based on a video sequence.

In another embodiment, at least one server is configured for maintaining a digital asset. The server or servers include at least one unit of memory and at least one processor coupled with the memory. The processor or processors are configured for providing a method. The method includes (1) receiving the digital asset, wherein the digital asset is associated with a blockchain. The method further includes (2) modifying the digital asset to provide a first effect and (3) securing the first modified digital asset to the blockchain.

In another embodiment, a non-transitory computer-readable storage medium storing instructions is configured to be implemented on at least one server including at least one processor. The instructions when executed by the processor or processors cause at least one server to perform a method of maintaining a digital asset. The method includes (1) receiving the digital asset, wherein the digital asset is associated with a blockchain. The method further includes (2) modifying the digital asset to provide a first effect and (3) securing the first modified digital asset to the blockchain.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings.

DETAILED DESCRIPTION

Figure 1:
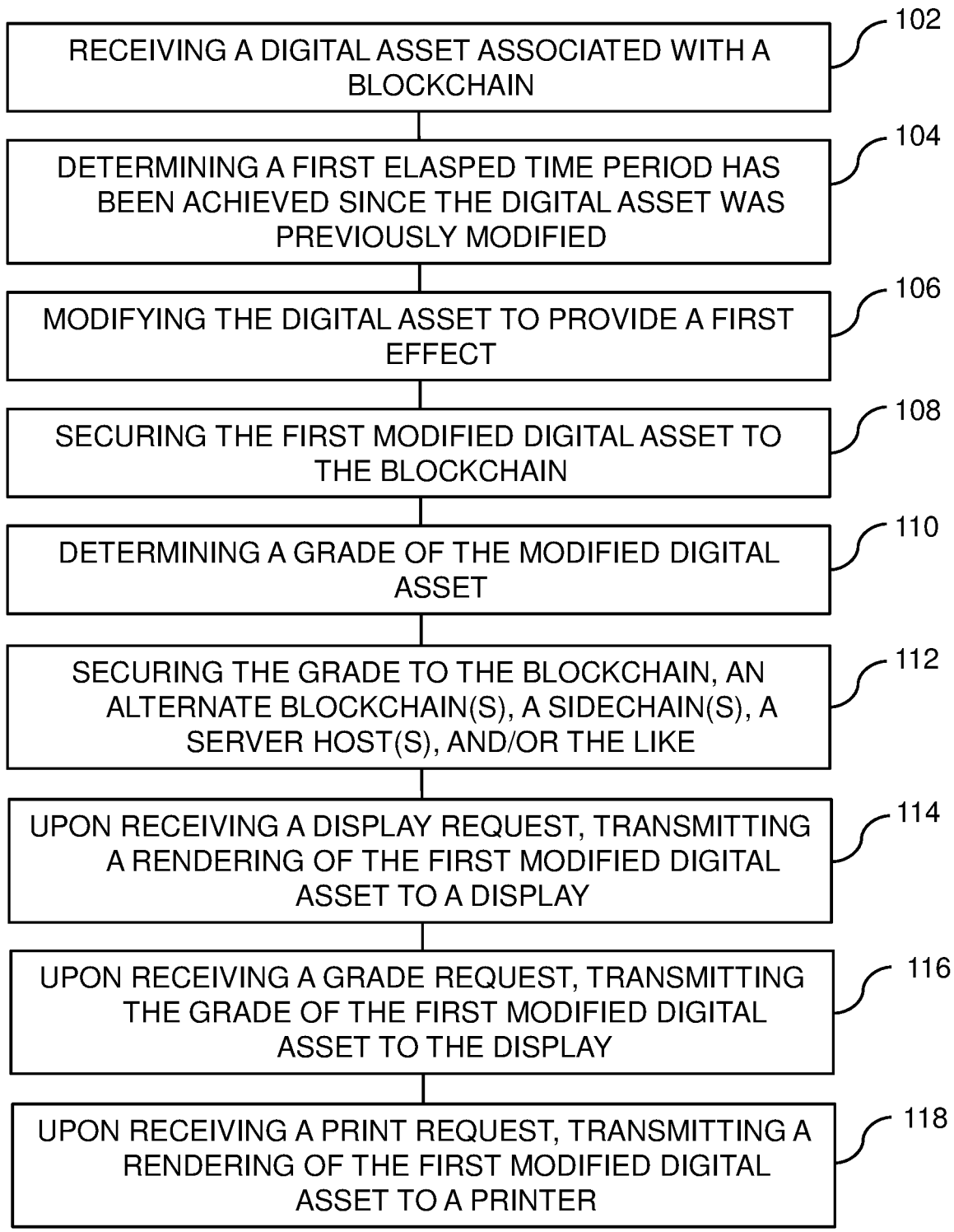
FIG. 1 depicts a flow chart illustrating a method of providing an effect (e.g. aging) and grading a digital asset in accordance with embodiments of the present disclosure.

The subject matter disclosed herein relates to non-fungible token (NFTs). More specifically; devices, systems, and methods for maintaining a digital asset are disclosed.

The following description and figures are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Disclosed herein are methods, systems, and devices for maintaining a digital asset. providing unique aging and grading of digital assets. In one embodiment, FIG. 1 depicts a flow chart 100 illustrating a method of providing an effect (e.g. aging) and grading a digital asset. The method may be implemented on one or more servers, one or more personal computers, one or more workstations, one or more mobile computing devices (e.g. laptops, smart tablets, smart phones, etc.), and/or the like.

In step 102, the method includes receiving the digital asset. The digital asset may be associated with a blockchain. The blockchain may be an Ethereum blockchain. The digital asset may also be a part of a non-fungible token (NFT). The digital asset may represent a physical object including a collectable and a case. The collectable may be a trading card, a stamp, a coin, a piece of paper currency, a doll, a toy, a model car, a vinyl record cover, a comic book, a piece of art, a piece of jewelry, an audio recording, a video recording, and/or the like.

In step 104, the method includes determining a time period from when the digital asset was previous modified with a previously applied effect. The previously applied effect may an aging effect and/or a usage effect. The previously applied effect may be associated with the collectable and/or the case In step 106, the method includes applying an additional effect to the digital asset. The additional effect may an aging effect and/or a usage effect. The additional effect may be associated with the collectable and/or the case.

In step 108, the method includes securing the digital asset with the additional effect to the blockchain.

In step 110, the method includes determining a grade associated with the digital asset with the additional effect. The grade may be a letter grade or a number grade. The grade may be a numerical value between 0 and 10, 0 and 100. The letter grade may be a letter between "A" and "F". For example, the letter grade may be a "B+" or similar.

In step 112, the method includes securing the grade to the blockchain. In some embodiments, the grade will not be secured to the blockchain. In still other embodiments, the grade may be secured to alternate blockchains, sidechains, server hosts, and/or the like.

In step 114, the method includes receiving a display request and transmitting a rendering of the digital asset with the additional effect to a display. The display may be associated with a personal computer, a smart TV, a laptop, a smart phone, a smart table, a smart watch, a holographic projector, or the like. The display may be a portion of a virtual reality (VR) user interface within a VR headset and/or and augmented reality (AR) user interface within an AR headset. The AR headset may be a Vuzix Blade AR headset, a Meta Vision Meta 2 AR headset, a Optinvent Ora-2 AR headset, a Garmin Varia Vision AR headset, a Solos AR headset, an Everysight Raptor AR headset, a Magic Leap One headset, a Hololens, an ODG R-7 Smart-glasses System, an iOS ARKit compatible device, an ARCore compatible device, or the like. The VR headset may be a Pansonite 3D VR headset, a VRIT V2 VR headset, an ETVR, a Topmaxions 3D VR glasses, a Pasonomi VR headset, a Sidardoe 3D VR Headset, a VR Elegiant VR headset, a VR Box VR headset, a Bnext VR headset, a Vive VR headset, a Valve Index, a Meta Rift VR headset, a Meta Quest VR headset, or the like.

In step 116, the method includes receiving a grade request and transmitting the grade of the digital asset with the additional effect to the display.

In step 118, the method includes receiving a print request and transmitting a rendering of the first modified digital asset to a printer. The printer may be a three-dimensional (3D) printer. The rendering may include a fingerprint/hash and or other unique identifier (ID) to identify each printing event.

In a preferred embodiment, the method of FIG. 1 may be implemented on a server. The server may be a physical server or a virtual server. The server may also be configured as a plurality of physical servers, virtual servers, and/or containers. In some embodiments, an Ubuntu® server may provide the virtual server and may be implemented as a separated operating system (OS) running on one or more physical (i.e. hardware implemented) servers. Any applicable virtual server may by be used for the Ubuntu® Server function. The Ubuntu® server or other server may be implemented within the Microsoft Azure®, Amazon Web Services (AWS®), IBM cloud computing, environment, or the like.

The method of FIG. 1 provides a solution to the lack of one-of-a-kind imperfections or other distinguishing elements in collectible digital media assets. Creators are no longer limited to releasing low quantity editions which forces a difficult balance between valuation of the works and earnings potential.

As such, a lack of distinguishing factors means that grading collectability and rarity is determined by sequential mint order, token ID or a serial number assigned at mint (a low number in a mint run is considered more desirable than a higher number). This limited range of collectible indicators are determined at mint and do not change over time. They are immutable and live forever on the blockchain.

Specifically, an "Immutable Grading Service" is provided using the mechanisms of time, perceptible wear and tear, and interactivity to replicate and expand on real-world aging, transformation, degradation and erosion. These mechanisms, when applied to a digital media asset, act as an agent to distinguish otherwise identical works and allow them to be differentiated, authenticated and graded as verifiably unique 1/1 pieces.

On submission by a creator, this "Immutable Grading Service" takes a clean digital media asset and adds various aging components, assigns a grade based on this new pre-aged condition, and encapsulates/wraps the new digital media asset into a unique NFT.

Once an asset is provided a condition and graded, a digital certificate of authenticity known as a smart contract is created. The new graded and encapsulated digital media asset is then deposited by the service to its owner's wallet. It becomes a more uniquely appreciable item than one that is not graded and encapsulated.

Digital assets that may be graded include (but are not limited to) images, video, audio, 3D objects, NFTs (including preminted), and/or the like.

The grading feature is based on a grading curve. The physical quality of a graded digital asset is derived from quality factors that are relevant to that type of media. For example, an image's quality factors could include the centering offset of the image as applied to its backing media (i.e. a digital canvas or a card), the amount of "paint" that has been worn away, or bending and tearing of the backing media. These factors are different from the quality factors of an audio track, for example, which might include background audio noise, hiss, and crackle.

Each asset is given several categorical grades based on the card's quality factors. Using images as an example again, categorical grades might include "Surface", "Centering", or "Edges". In this example, the Surface category could be made up of Paint Wear, Scratch, and Creasing quality factors.

Finally, based on the categorical grades, a summary grade is calculated. For example, consider an image with the following categorical grades:

Surface=4
Centering=5
Corners=7
Edges=8

This image would have a summary grade of 6. When displaying the final graded digital asset, the creator can choose to display the summary grade, the categorical grades, both summary and categorical grades, or neither.

Figure 2:
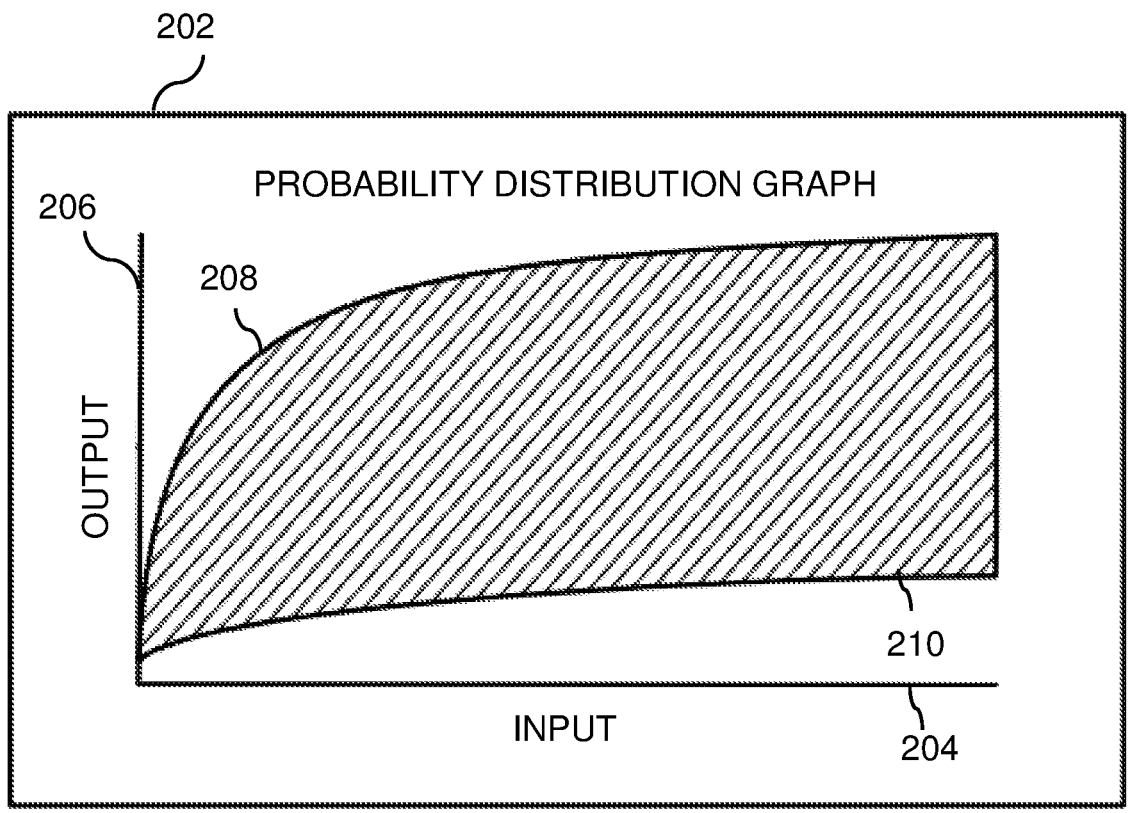
FIG. 2 depicts a graph illustrating a probability distribution function represented with two curves for grading in accordance with embodiments of the present disclosure.

FIG. 2 depicts a graph 202 illustrating a probability distribution function for grading in accordance with embodiments of the present disclosure. The probability distribution function takes in two inputs, a seed number and an arbitrary input. The arbitrary input maps to the x-axis 204 of the graph. At a given point on the x-axis 204, the function picks an output from the y-axis 206 bounded by the two curves 208 and 210. This output on the y-axis 206 is randomly selected using the input seed number, so the resulting value is deterministic. The curves 208 and 210 can be individually adjusted, enabling the user to finely control the probable values of the output given the input. The x-axis 204 can be driven by a variety of inputs, which is discussed further later in this document.

Figure 3:
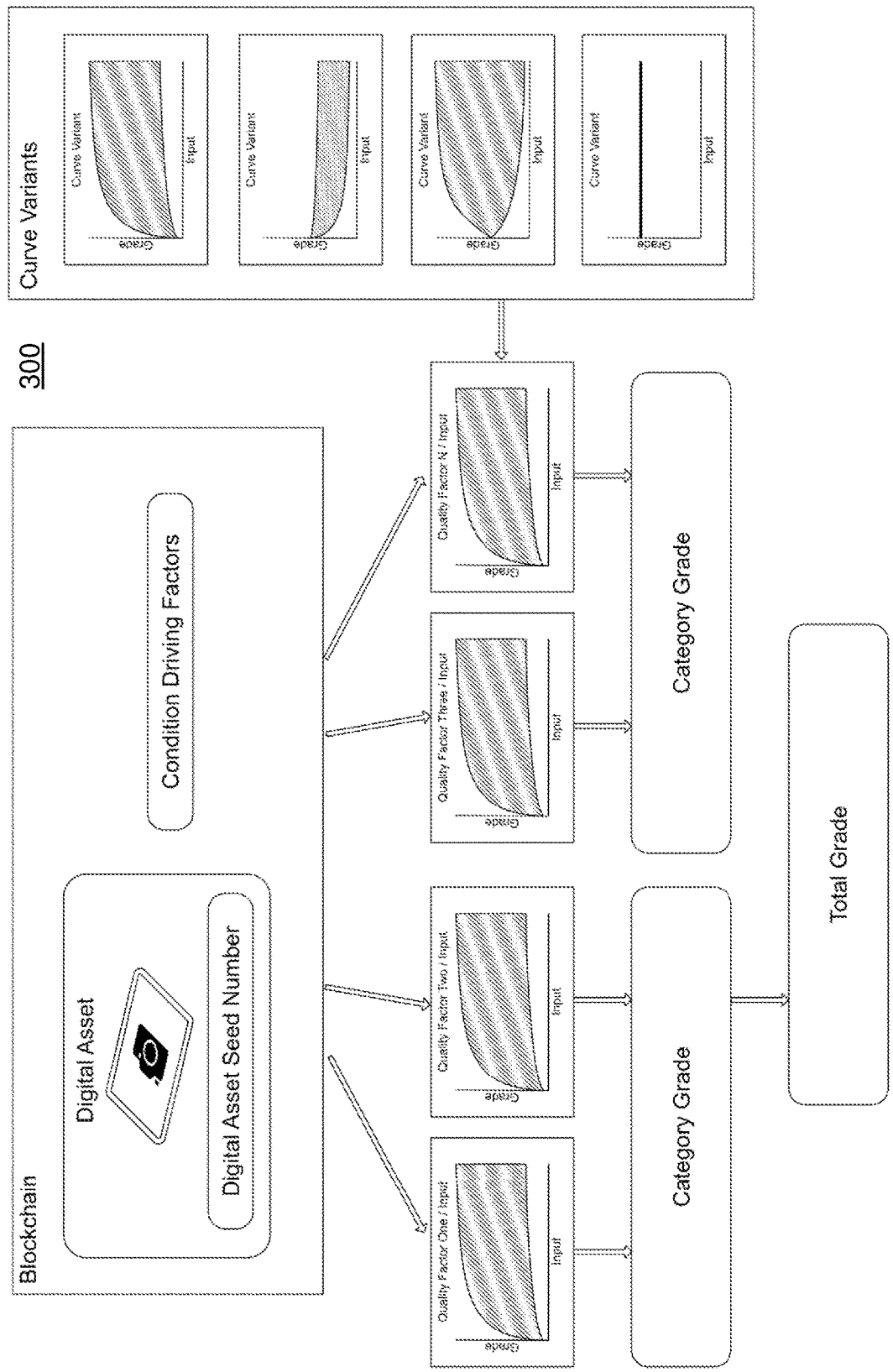
FIG. 3 depicts a diagram illustrating a grade generation process for the digital asset in accordance with embodiments of the present disclosure.

FIG. 3 depicts a diagram 300 illustrating a grade generation process for the digital asset in accordance with embodiments of the present disclosure.

Each quality factor (e.g., quality factors one through four) is assigned several probability distribution functions (e.g., curve variants), one for each input that can drive the quality factor. For example, if a creator wants to wear away the paint on a digital asset as it gets older, a probability distribution function is assigned to that quality factor with the asset's age as an input. That curve would then control the probabilistic condition of the paint over time. The creator could also add other factors that drive the quality factor—for example volume of sales of a digital asset. Each additional factor would co-influence the value of the quality factor.

Each probability distribution function of each quality factor is evaluated, creating numbers representing the condition of each quality factor. The value (e.g., quality grades) of each quality factor is averaged together into their corresponding category grades, which are in turn averaged together into the total grade for the asset.

Crucially, the seed number used to drive the probability distribution functions is stored as part of the asset. All randomization in this process is driven from this seed, so grade evaluation is entirely deterministic. This means that every time a person views the digital asset, the system can read the inputs and refresh the grades, producing a repeatable and correct result every time.

Figure 4:
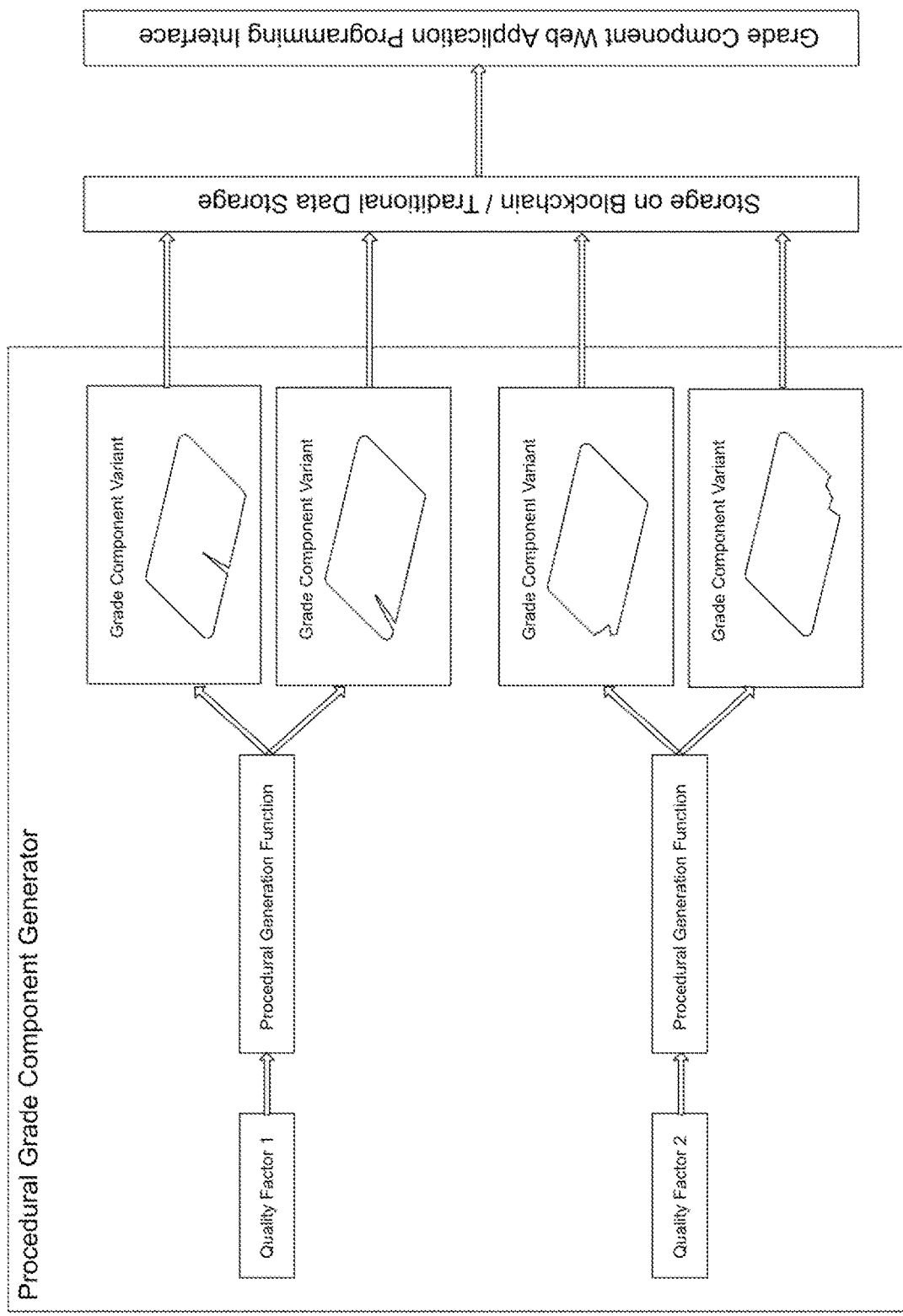
FIG. 4 depicts a diagram illustrating how a grade component database is generated in accordance with embodiments of the present disclosure.

FIG. 4 depicts a diagram 400 illustrating how a grade component database is generated in accordance with embodiments of the present disclosure. Grading components are representations of the grade that are layered over the clean digital asset to create the graded asset. Grading components correspond directly to the asset's quality factors (e.g., quality factors one and two). For example, given an image with the paint wear quality factor, the grading component is a series of image maps that create the effect of the image's paint wearing away.

Each quality factor's value is represented as a percentage with segmented (rather than continuous) value. For example, a quality factor could be segmented into increments of 0.1, so it could take on values like 5.1 or 5.2, but not intermediate values like 5.15. Each value increment of each quality factor can have multiple variants. For example, there could be several assets with 50% edge wear, but there are multiple variants of edge wear at 50% so each has different looking grading components.

The system pre-generates procedural grading components (using procedural generation functions) for all possible grade component variants of each possible value of each quality factor, and stores them in the blockchain (i.e. immutable storage) to ensure they can be permanently accessed. A mapping is created between the input quality factor and variant to the resulting grading component. A grade component web application programming interface (API) is provided for access to the blockchain. In other embodiments, other storage arrangements may be used either with or without blockchain technology.

Figure 5:
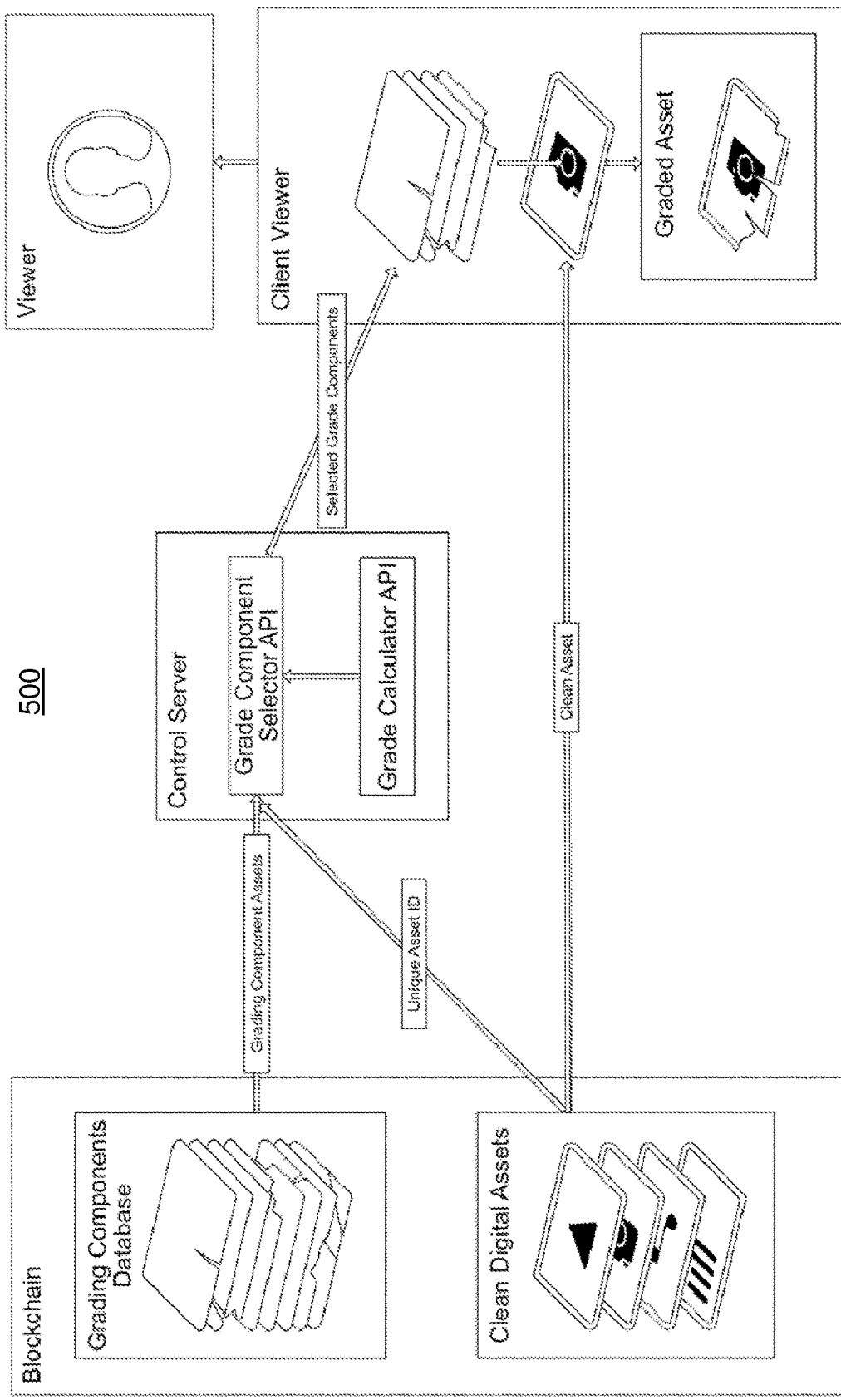
FIG. 5 depicts a diagram illustrating one embodiment of how the graded digital asset may be viewed in accordance with embodiments of the present disclosure.

FIG. 5 depicts a diagram 500 illustrating one embodiment of how the graded digital asset may be viewed in accordance with embodiments of the present disclosure. A blockchain includes clean digital assets and a grading components database. A control server includes a grade component selector API and a grade calculator API for obtaining grading component assets and unique asset identifiers (IDs) from the block chain. The control server is configured to provide selected grade components to a client viewer accessed by a viewer. The client viewer is configured to retrieve a clean asset from the blockchain and apply the selected grade components to create a graded assets Further explained, the grade calculation system is placed behind a private web Application Programming Interface (API), so the grade of a digital asset can be queried and updated at any time. The mapping between input quality factors, variant numbers, and grading components is made available behind a public web API.

When a person views the digital asset, they do so through a viewer application, which may be embedded in a web page or provided as a stand-alone application. The viewer application requests the asset's grading components from the mapping API. The API takes the digital asset's unique identifier as input, sends that identifier to the grading system API to calculate and retrieve the asset's quality factors, calculates a variant number from the asset's seed number, and then uses the grading component mapping to return the correct grading components.

When the viewer receives the grading components, it programmatically layers the grading components on top of the base digital asset using one or many shaders, along with 3D modeling techniques, producing the final graded effect. Optionally, the summary grade and categorical grades can be displayed alongside the asset.

Grading models include progressive grading, regressive grading, fluid grading, and static grading. Progressive grading is a sequential grading curve which begins at or near an imperfect blemished condition and evolves over time towards a clean and flawless condition. Regressive grading is a sequential grading curve which begins at or near a clean and flawless condition and evolves over time towards an imperfect, blemished condition. Fluid grading includes a sequential grading curve which may begin at or near an imperfect, blemished condition or a clean and flawless condition and whose grading direction may change based on a number of custom factors. Static grading includes assigning a grade at mint that is immutable. This grade may be generated anywhere across the condition spectrum.

For example only (and not required), a grading standard may be between "0" and "10" as follows:

- 0.5 (Poor) A heavily defaced collectible with a number of major defects. Some pieces will also be missing.
- 1.0 (Fair) A very poorly handled collectible with a heavy accumulation of major defects.
- 1.5 (Fair/Good) A collectible that shows extensive evidence of handling with a heavy accumulation of major defects.
- 1.8 (Good−) A collectible that shows extensive evidence of handling with numerous major defects.
- 2.0 (Good) A collectible that shows extensive evidence of handling with numerous moderate-to-major defects.
- 2.5 (Good+) A collectible that shows extensive evidence of handling with multiple moderate-to-major defects.
- 3.0 (Good/Very Good) A collectible that shows significant evidence of handling with several moderate-to-major defects.
- 3.5 (Very Good−) A below-average collectible with several major defects or an accumulation of multiple moderate defects.
- 4.0 (Very Good) A below-average collectible with multiple moderate defects.
- 4.5 (Very Good+) A slightly below-average collectible with multiple moderate defects.
- 5.0 (Very Good/Fine) An average collectible with several moderate defects.
- 5.5 (Fine−) A slightly above-average collectible with several moderate defects.
- 6.0 (Fine) A slightly above-average collectible with a major defect and some smaller defects, or a significant accumulation of small defects.
- 6.5 (Fine+) An above-average collectible with a major defect and some smaller defects, or a significant accumulation of small defects.
- 7.0 (Fine/Very Fine) An above-average collectible with a major defect or an accumulation of small defects.
- 7.5 (Very Fine−) An above-average collectible with a moderate defect or an accumulation of small defects.
- 8.0 (Very Fine) An attractive collectible with a moderate defect or an accumulation of small defects.

8.5 (Very Fine+) An attractive collectible with a moderate defect or a number of small defects.

9.0 (Very Fine/Near Mint) A very well-preserved collectible with good eye appeal. There will be a number of minor handling and/or manufacturing defects.

9.2 (Near Mint−) A very well-preserved collectible with some wear and small manufacturing or handling defects.

9.4 (Near Mint) A very well-preserved collectible with minor wear and small manufacturing or handling defects.

9.6 (Near Mint+) A very well-preserved collectible with several minor manufacturing or handling defects.

9.8 (Near Mint/Mint) A nearly perfect collectible with negligible handling or manufacturing defects.

9.9 (MINT) The collectible is nearly indistinguishable from a 10.0 but will have a very minor manufacturing defect. It will not have any evidence of handling defects.

10 (GEM MINT) The highest grade assigned. The collectible must have no evidence of any manufacturing or handling defects.

Additionally disclosed herein is "relational grading" as a system whereby a grading curve is directly related to some external data or event(s) that affect the chosen grading model in a positive or negative manner. Relational grading is affected by external events which activate the grading algorithm over time. This relationship can be set upon mint, or progressively polled from an external data source.

A first example includes time as duration or timing of the grading changes. This variant can be predetermined at mint and includes length of time over which grading will change (e.g., ages or fades the longer it's held, improves longer it's owned).

A second example includes external events as a catalyst for grading change. Grading changes can be directly polled from any measurable external event or data (e.g., if the digital asset receives wider notice, the grade may improve).

A third example includes interaction with the asset. This example includes frequency of use or view and specified actions taken at specific times, in a certain order, and/or the like (e.g., "Tamagotchi®-style" taking care of the asset on a regular basis may stabilize aging or improve condition).

A fourth example includes market activity as a data source for grading change. This example includes sales of an asset (e.g., may age every time it's sold, improves every time sold). Additionally, this example may include sales volume, market cap, floor price, and/or ceiling price.

A fifth example includes pure number generations and/or one or more combinations of the previous examples.

Another method of reproduction differentiation may involve the inclusion of unique modifications to the original asset. The layered approach used to generate the final displayed NFT in the Client Viewer opens other opportunities to differentiate between reproductions of a digital asset. New layers may be inserted to modify the end product, driven by the grading process, direct random chance, or through manual intervention. These layers can include but are not limited to signatures, foil materials, holograms, logos, stamps, etc.

For example, a digital asset creator might release a series of comic books that are graded and presented using the Immutable Grading Service technology. Following the release, that creator could choose to hold an in-person or virtual event, and using the Immutable Grading Service technology, add a signature to the NFTs of those in attendance.

As an additional example, a creator using a static grading mechanism driven by pure random number generation might choose to apply a special logo to or effect to digital assets with a total grade of 9 or higher. Using the Immutable Grading Service technology, those modifications could be automatically layered into the final presentation of the asset based on the grade.

Presentation (i.e. form of delivery) of the graded digital asset may be customized by the minter/creator. Assets may be aged or transformed on any surface or layer of an asset (front, back, sides, etc.) using the same techniques and principles.

Figure 6:
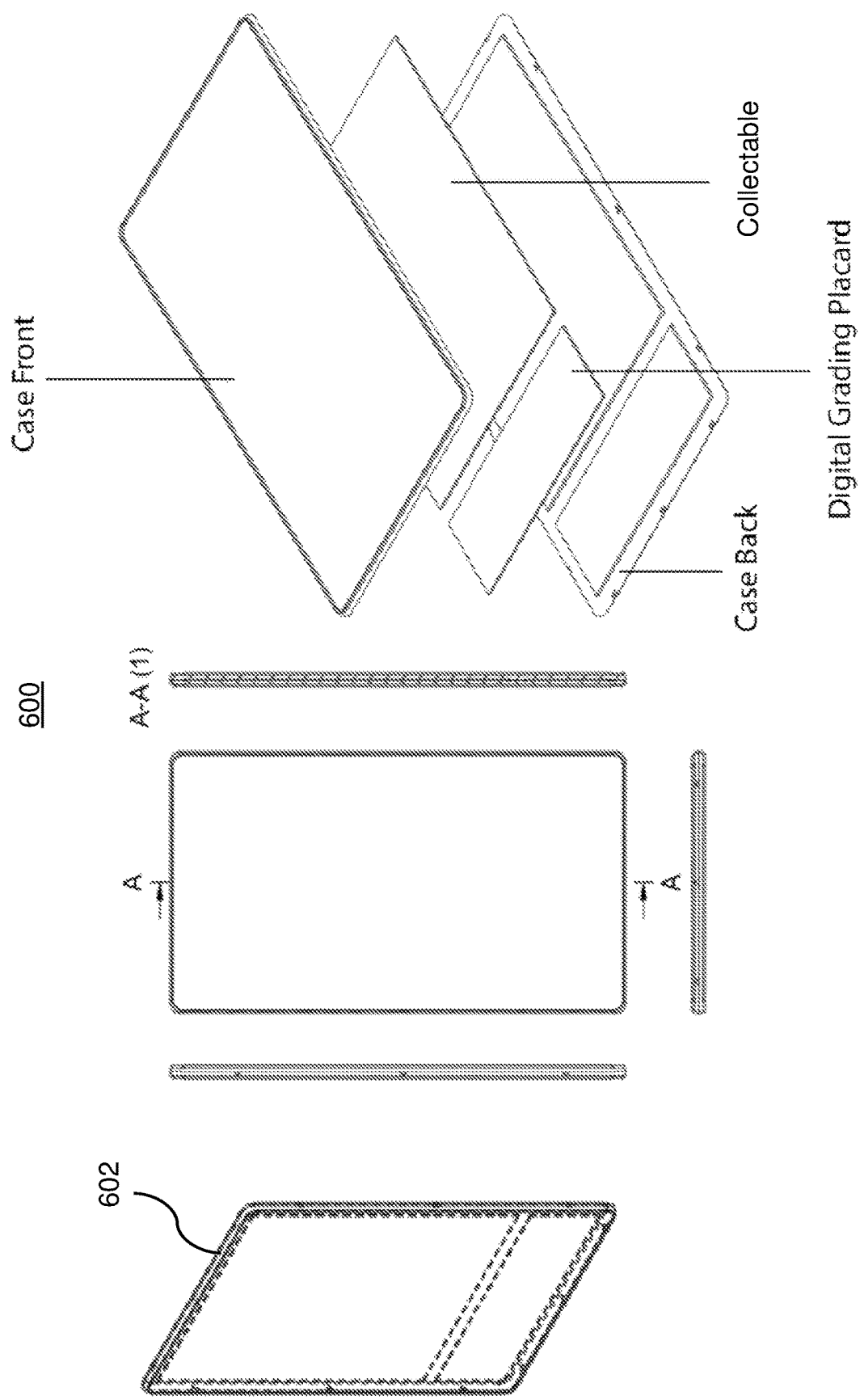
FIG. 6 depicts a diagram illustrating a case design to include the digital asset and a digital grading placard in accordance with embodiments of the present disclosure.

FIG. 6 depicts a diagram 600 illustrating a case design to include the digital asset and a digital grading placard in accordance with embodiments of the present disclosure.

The case 602 (having a case front and a case back) has a first volume for holding the collectable and a second area for holding a grading card (e.g., a digital grading placard). The case 602 and the placard are optional. The case, the collectable, and/or the placard may be printed (e.g. 3D printed) individually and/or all as one.

Figure 7:
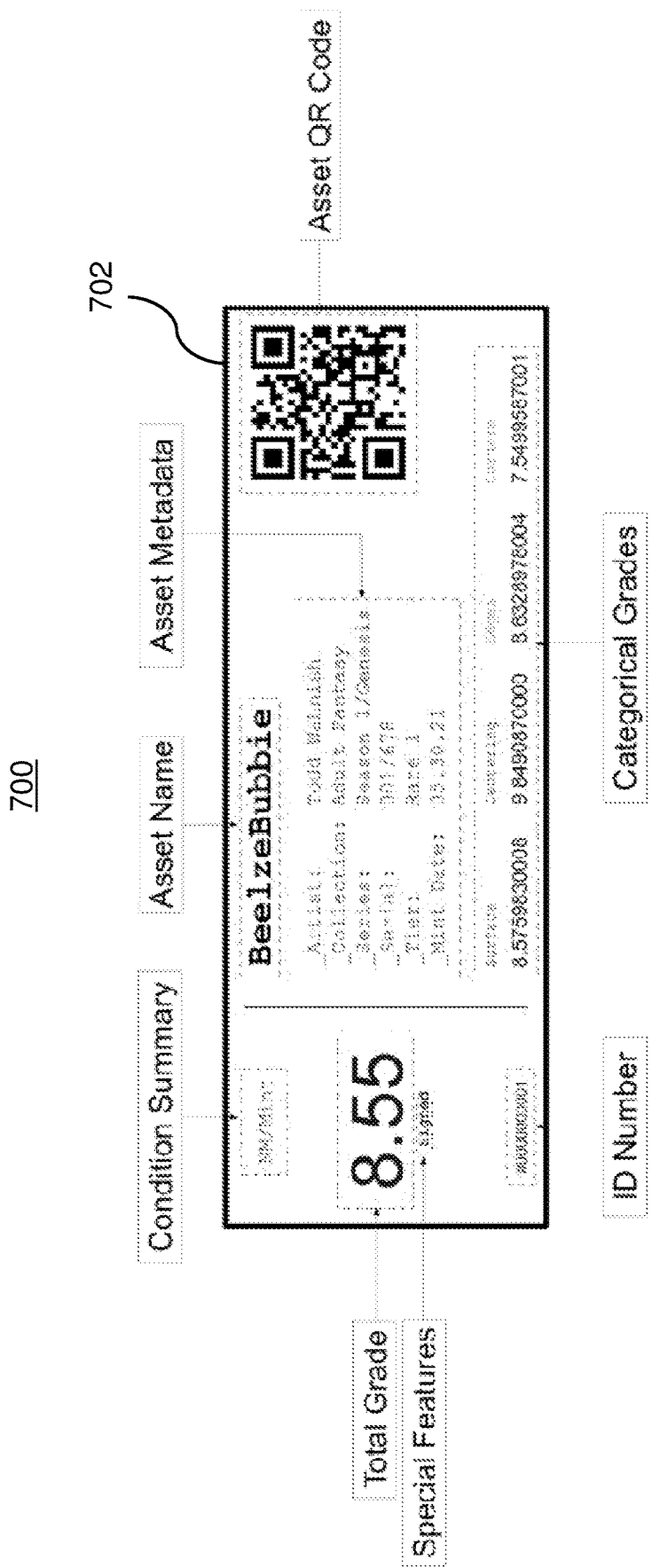
FIG. 7 depicts a diagram 700 illustrating a digital grading placard in accordance with embodiments of the present disclosure.

FIG. 7 depicts a diagram 700 illustrating a digital grading placard 702 in accordance with embodiments of the present disclosure. The placard 702 may include a condition summary in addition to a grading scale standard identifier. The placard may also include a total aggregate grade (e.g., 6.55) as an average of the categorical grades. The placard may further include special features such as unique or rare attributes assigned to the asset (E.g., Gold Foil, Chromium, Holofoil, Hologram, Autograph, Evolving/Transformational, and Collaboration).

Additional placard features may include an ID number and an asset name. The ID number may be the sequential mint order of all assets throughout time. The asset name may include a title and/or an identifier of the asset. Asset metadata may also be presented including customizable display of relevant information to be decided by a creator.

Categorical grades including an average of a group of quality factors are displayed (e.g., surface, centering, edges, corners, or the like).

An asset quick response (QR) code may be displayed: In other embodiments, a bar code may be displayed. Links to media and/or source files on the blockchain may also be included on the placard.

Rarity levels (not shown in FIG. 7) may be included with the placard. Rarity levels may be shown via colors and/or animated effects, pips, logos, and/or the like (e.g., "bronze", "silver", "gold", "prism", etc.).

Figure 8:
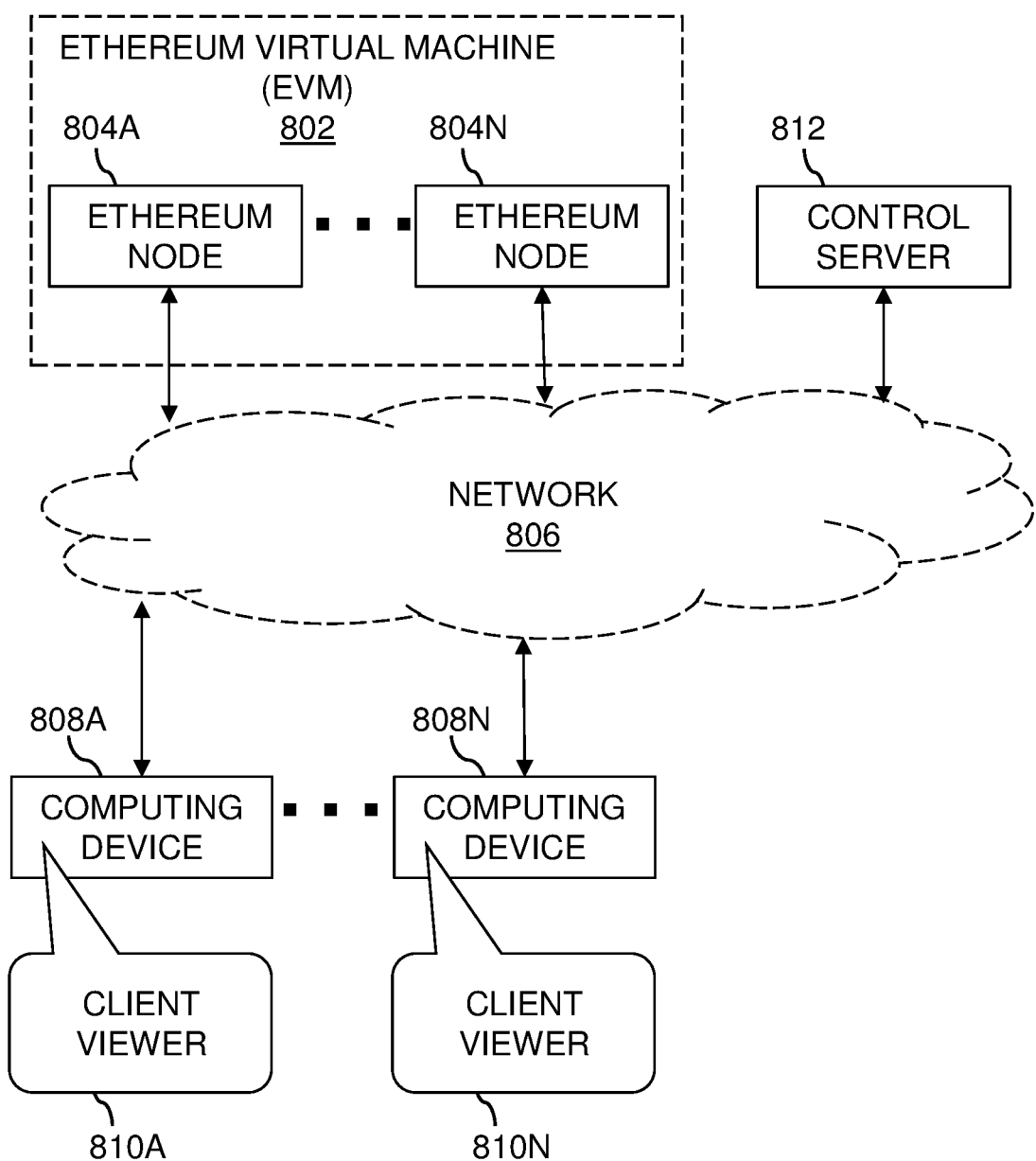
FIG. 8 depicts a diagram illustrating an Ethereum ecosystem configured for aging and grading NFTs in accordance with embodiments of the present disclosure.

FIG. 8 depicts a diagram illustrating an Ethereum ecosystem 800 configured for aging and grading NFTs in accordance with embodiments of the present disclosure. Ethereum ecosystem 800 includes an Ethereum virtual machine (EVM) 802 implemented across a plurality of Ethereum nodes 804A-804N. The plurality of Ethereum nodes 804A-804N (i.e. the EVM 802) may store one or more of the previously disclosed blockchains. The plurality of Ethereum nodes 804A-804N may include full nodes, light nodes and archive nodes. A full node may store an entire copy of an Ethereum blockchain. A light node may only store block headers associated with the entire copy. An archive node may store all blockchain data beginning with an Ethereum genesis block. The plurality of Ethereum nodes 804A-804N communicate over a network 806 and may be implemented on a plurality of personal computers, workstations, and/or servers. The servers may be implemented within a cloud computing environment.

The network 806 may be any type or combination of wired, wireless, and/or optical networks. The network 216 may include one or more wide area networks (WANs), local area networks (LANs), and personal area networks (PANs). The network 216 may also include the Internet.

The Ethereum ecosystem 800 further includes a plurality of computing devices 808A-808N executing a plurality of client viewers 810A-810N. The plurality of client viewers 810A-810N may be configured to display one or more digital assets and modified digital assets (e.g., on or more NFTs including aging effects and gradings) from the one or more blockchains stored within the EVM 802.

The Ethereum ecosystem 800 further includes a control server 812 for implementing aging effects and gradings). In some embodiments the control server 812 may be implemented within the Ethereum nodes 804A-804N.

Figure 9:
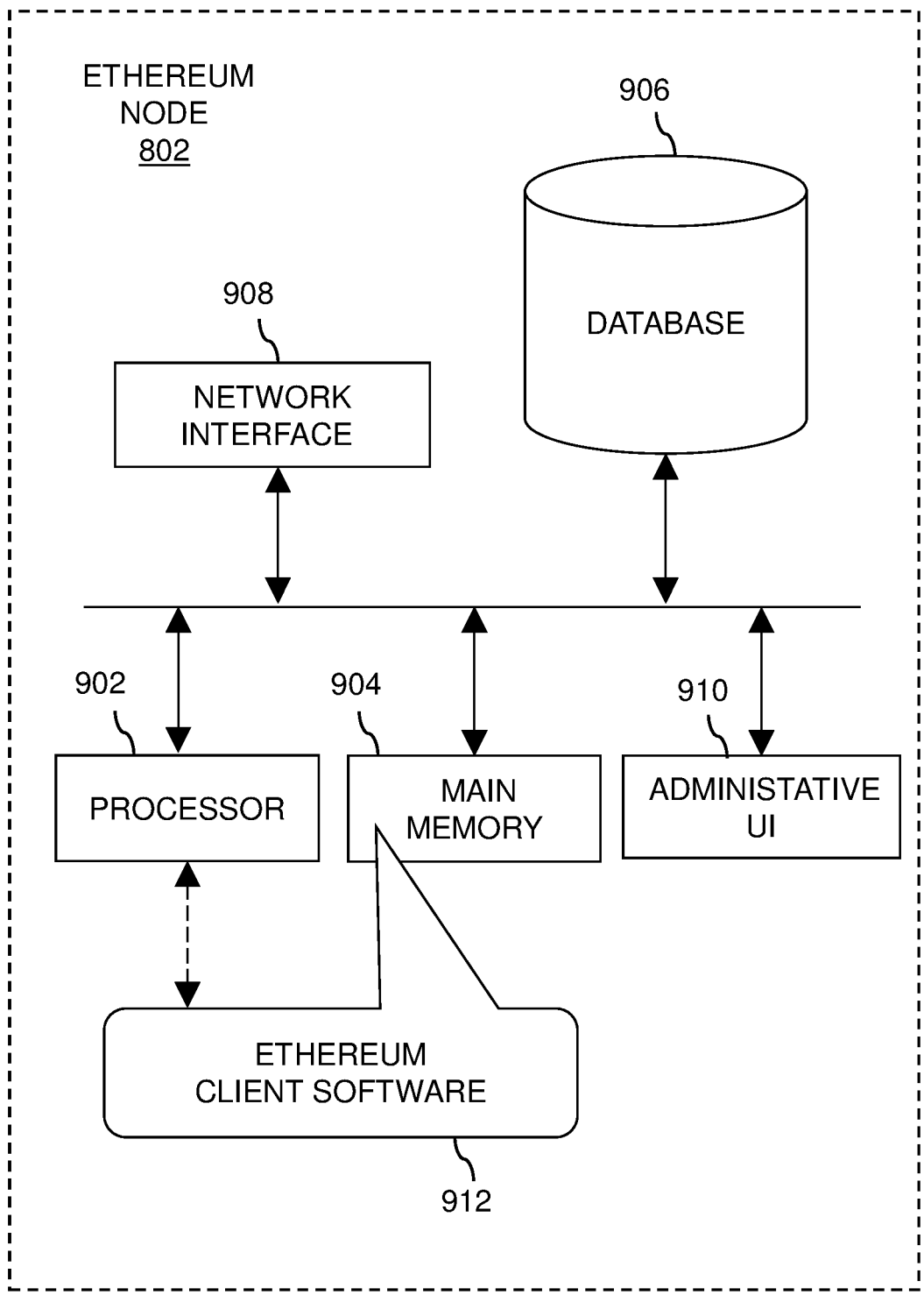
FIG. 9 depicts a block diagram 900 illustrating an Ethereum node in accordance with embodiments of the present disclosure.

FIG. 9 depicts a block diagram 900 illustrating an Ethereum node 802 as previously depicted in FIG. 8 in accordance with embodiments of the present disclosure. The Ethereum node 802 includes a processor 902, a main memory 904, a storage memory (e.g. database), a network interface 908, an administrative user interface (UI) 910, and Ethereum client software 912.

The processor 902 may be a multi-core server class processor suitable for hardware virtualization. The processor may support at least a 64-bit architecture and a single instruction multiple data (SIMD) instruction set. The main memory 904 may include a combination of volatile memory (e.g. random access memory) and non-volatile memory (e.g. flash memory). The database 906 may include one or more hard drives.

The datacenter network interface 908 may provide one or more high-speed communication ports to the data center switches, routers, and/or network storage appliances. The datacenter network interface 908 may include high-speed optical Ethernet, InfiniBand (IB), Internet Small Computer System Interface (iSCSI), and/or Fibre Channel interfaces. The administration UI may support local and/or remote configuration of the server 204 by a datacenter administrator.

In some embodiments, Ethereum node 802 may be configured to be executed on an Ubuntu® server. In some embodiments, the Ubuntu® server may be distributed over a plurality of hardware servers using hypervisor technology.

Figure 10:
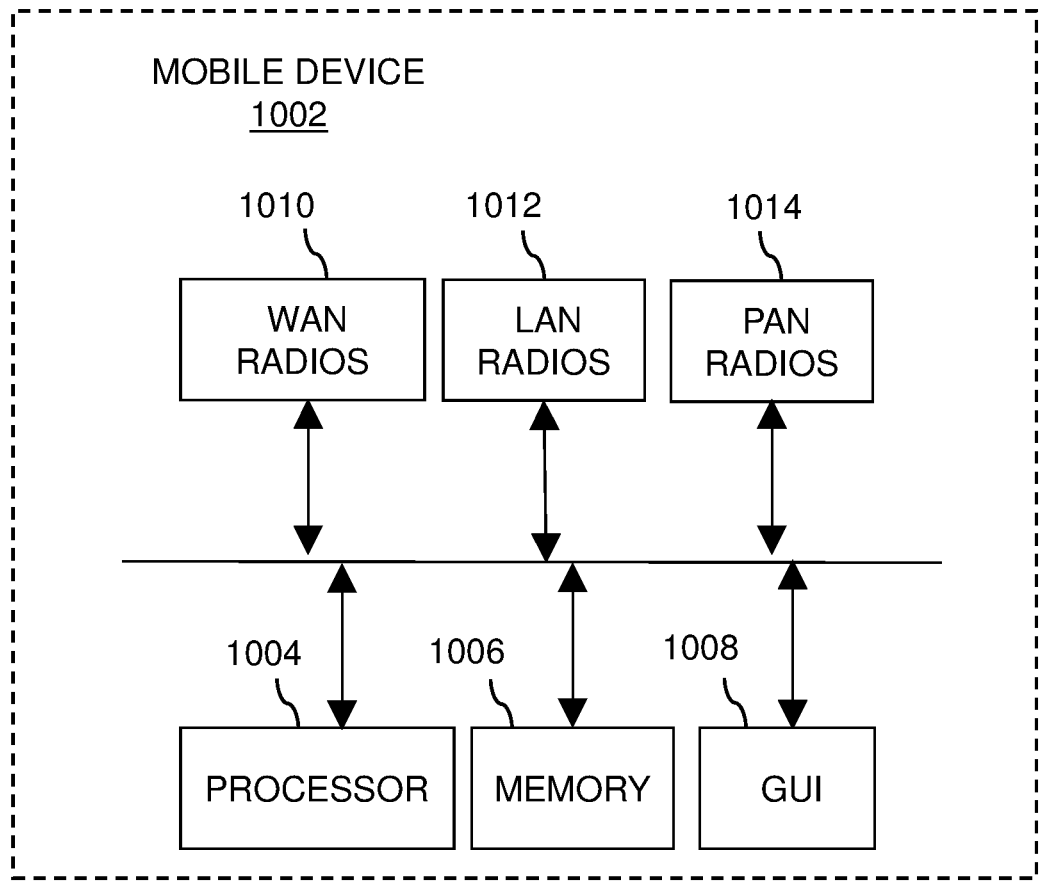
FIG. 10 depicts a block diagram 1000 of a mobile device 1002 for viewing of an NFT in accordance with embodiments of the present disclosure.

FIG. 10 depicts a block diagram 1000 of a mobile device 1002 for viewing of an NFT (e.g., executing the client viewer 810 of FIG. 8) in accordance with embodiments of the present disclosure. The mobile device 1002 may be one embodiment of the computing device 808 of FIG. 8. The mobile device 1002 includes a processor 1004, a memory 1006, a graphical user interface (GUI) 1008, WAN radios 1010, LAN radios 1012, and PAN radios 1014. In some embodiments, the mobile device 1002 may be a smart phone, a smart tablet, a smart watch, a laptop, or the like. The mobile device 1002 may be an iPhone® or an iPad®, using iOS® as an OS. In other embodiments, the mobile device 1002 may be a mobile terminal including Android® OS or the like.

In some embodiments, the processor 1004 may be a mobile processor such as the Qualcomm® Snapdragon™ mobile processor. The memory 1006 may include a combination of volatile memory (e.g. random access memory) and non-volatile memory (e.g. flash memory). The memory 1006 may be partially integrated with the processor 402. The GUI 406 may be a touchpad display. The WAN radios 1010 may include 2G, 3G, 4G, and/or 5G technologies. The LAN radios 1012 may include Wi-Fi technologies such as 802.11a, 802.11b/g/n, 802.11ac, 802.11.ax or the like circuitry. The PAN radios 1014 may include Bluetooth® technologies.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EEPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby, JavaScript, Solidity, Ethereum EVM, Java, Python, Ruby, PHP. C, C++, C #, Objective-C, Go, Scala, Swift, Kotlin, OCaml, or the like. The program code may execute entirely on the user's computer, partly on the user's computer, as a stand-alone software package, partly on the user's computer, and partly on a remote computer or entirely on the remote computer or server. In the latter situation scenario, the remote computer may be connected to the user's computer through any type of network, including a LAN or a WAN, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create an ability for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for generating and maintaining distinguishing factors between multiple reproductions of digital collectable assets, the computer implemented method comprising:
   receiving a digital asset over a network, wherein the digital asset is secured with a blockchain associated with a crypto wallet;
   modifying the digital asset to add or remove a layered effect of a first type of real-world defect when rendered, wherein:
      modifying the digital asset is triggered based on at least one of:
         an elapsed time since minting of the digital asset;
         a change in ownership of the digital asset;
         viewing activity associated with the digital asset; and
         market activity associated with the digital asset; and
      the first type of real-world defect is at least one of:
         a manufacturing defect;
         a handling defect; and
         an aging defect;
   securing the modified digital asset to the blockchain;
   determining a grade of the modified digital asset;
   securing the grade to at least one of the blockchain, an alternate blockchain, a sidechain, or a server host, wherein:
      the modified digital asset imitates a real-world collectable object having the first type of real-world defect when rendered to a display;
      the grade imitates a real-world grade associated with the real-world collectable object having the first type of real-world defect; and
      the modified digital asset is a portion of a non-fungible token (NFT);
   receiving, over the network, a display request from a remote device; and
   transmitting, over the network, a rendering of the modified digital asset to a remote display upon receiving the display request;

receiving a grade request, wherein determining the grade of the modified digital asset is initiated automatically upon receiving the grade request; and transmitting the grade of the modified digital asset to the display.

2. The computer implemented method of claim 1, wherein determining the grade of the modified digital asset is initiated upon modifying the digital asset to provide the first layered effect when rendered.

3. The computer implemented method of claim 1, wherein the real-world collectable object includes a case to protect an internal collectable.

4. The computer implemented method of claim 3, wherein the case includes a placard and the placard displays the grade.

5. The computer implemented method of claim 3, wherein the internal collectable is a trading card, a stamp, a coin, a piece of paper currency, a doll, a toy, a model car, a vinyl record cover, a comic book, a piece of art, an audio recording, a video recording, and a piece of jewelry.

6. The computer implemented method of claim 3, wherein the first layered effect when rendered represents a defect of the collectable.

7. The computer implemented method of claim 3, wherein the first layered effect when rendered represents a defect of the case.

8. The method of claim 1 further comprising
determining a value of the modified digital asset; and
securing the value and a timestamp to at least one of the blockchain, the alternate blockchain, the sidechain, and the server host.

9. The computer implemented method of claim 1, wherein the determining the grade of the modified digital asset is based on a sequential grading curve beginning at an imperfect condition and evolving over time to a near perfect condition.

10. The computer implemented method of claim 1, wherein the determining the grade of the modified digital asset is based on a sequential grading curve beginning at a near perfect condition and evolving over time to an imperfect condition.

11. The computer implemented method of claim 1, wherein the digital asset was previously modified with a previous effect wherein modifying the digital asset to add or remove provide the layered effect of the first type of real-world defect when rendered is further based on a first elapsed time period from when the digital asset was previously modified with the previous effect.

12. The computer implemented method of claim 1, wherein the modified digital asset is based on at least one of an audio sequence and a video sequence.

13. The computer implemented method of claim 1, wherein the grade of the modified digital asset is a numerical value.

14. The computer implemented method of claim 13, wherein:
the numerical value is greater than or equal to zero; and
the numerical value is less than or equal to ten.

15. The computer implemented method of claim 1, wherein the grade of the modified digital asset is a letter grade.

16. The computer implemented method of claim 1 further comprising transmitting a rendering of the modified digital asset to a three-dimensional (3D) printer.

17. The computer implemented method of claim 1, wherein determining a grade of the modified digital asset is based on:

a probability distribution function associated with the first type of real-world defect;
a relational time-based grading algorithm; and
market activity associated with the digital asset.

18. At least one computing device for generating and maintaining distinguishing factors between multiple reproductions of digital collectable assets, the computing device comprising:
at least one unit of memory; and
at least one processor coupled with the at least one unit of memory, the at least one processor configured for:
receiving a digital asset over a network, wherein the digital asset is secured with a blockchain associated with a crypto wallet;
modifying the digital asset to add or remove a layered effect of a first type of real-world defect when rendered, wherein:
modifying the digital asset is triggered based on at least one of:
an elapsed time since minting of the digital asset;
a change in ownership of the digital asset;
viewing activity associated with the digital asset; and
market activity associated with the digital asset; and
the first type of real-world defect is at least one of:
a manufacturing defect;
a handling defect; and
an aging defect;
securing the modified digital asset to the blockchain;
determining a grade of the modified digital;
securing the grade to at least one of the blockchain, an alternate blockchain, a sidechain, or a server host, wherein:
the modified digital asset imitates a real-world collectable object having the first type of real-world defect when rendered to a display;
the grade imitates a real-world grade associated with the real-world collectable object having the first type of real-world defect; and
the modified digital asset is a portion of a non-fungible token (NFT);
receiving, over the network, a display request from a remote device; and
transmitting, over the network, a rendering of the modified digital asset to a remote display upon receiving the display request;
receiving a grade request, wherein determining the grade of the modified digital asset is initiated automatically upon receiving the grade request; and
transmitting the grade of the modified digital asset to the display.

19. A non-transitory computer-readable storage medium storing instructions to be implemented on at least one computing device including at least one processor for generating and maintaining distinguishing factors between multiple reproductions of digital collectable assets, the instructions when executed by the at least one processor cause the at least one computing device to perform a method of:
receiving a digital asset over a network, wherein the digital asset is secured with a blockchain associated with a crypto wallet;
modifying the digital asset to add or remove a layered effect of a first type of real-world defect when rendered, wherein:
modifying the digital asset is triggered based on at least one of:
an elapsed time since minting of the digital asset;
a change in ownership of the digital asset;

viewing activity associated with the digital asset; and
market activity associated with the digital asset; and
the first type of real-world defect is at least one of:
a manufacturing defect;
a handling defect; and
an aging defect;
securing the modified digital asset to the blockchain;
determining a grade of the modified digital asset;
securing the grade to at least one of the blockchain, an alternate blockchain, a sidechain, or a server host, wherein:
the modified digital asset imitates a real-world collectable object having the first type of real-world defect when rendered to a display;
the grade imitates a real-world grade associated with the real-world collectable object having the first type of real-world defect; and
the modified digital asset is a portion of a non-fungible token (NFT);
receiving, over the network, a display request from a remote device; and
transmitting, over the network, a rendering of the modified digital asset to a remote display upon receiving the display request;
receiving a grade request, wherein determining the grade of the modified digital asset is initiated automatically upon receiving the grade request; and
transmitting the grade of the modified digital asset to the display.

* * * * *